(12) United States Patent
Zhao et al.

(10) Patent No.: US 9,807,541 B2
(45) Date of Patent: Oct. 31, 2017

(54) OFFLINE COMMUNICATION METHOD AND INTELLIGENT MOBILE TERMINAL

(71) Applicant: HUIZHOU TCL MOBILE COMMUNICATION CO., LTD., Huizhou, Guangdong (CN)

(72) Inventors: Shiqing Zhao, Huizhou (CN); Longcheng Zhao, Huizhou (CN)

(73) Assignee: HUIZHOU TCL MOBILE COMMUNICATIONS CO., LTD., Huizhou, Guangdong (CN)

( * ) Notice: Subject to any disclaimer, the term of this patent is extended or adjusted under 35 U.S.C. 154(b) by 97 days.

(21) Appl. No.: 14/901,221

(22) PCT Filed: Jan. 20, 2015

(86) PCT No.: PCT/CN2015/071090
§ 371 (c)(1),
(2) Date: Dec. 28, 2015

(87) PCT Pub. No.: WO2016/037457
PCT Pub. Date: Mar. 17, 2016

(65) Prior Publication Data
US 2016/0212569 A1 Jul. 21, 2016

(30) Foreign Application Priority Data
Sep. 12, 2014 (CN) .......................... 2014 1 0466767

(51) Int. Cl.
*H04W 76/02* (2009.01)
*H04L 5/14* (2006.01)
*H04W 4/00* (2009.01)

(52) U.S. Cl.
CPC .......... *H04W 4/005* (2013.01); *H04L 5/1469* (2013.01); *H04W 76/023* (2013.01)

(58) Field of Classification Search
CPC ... H04L 5/0001; H04L 5/0091; H04L 5/0092; H04L 5/0094; H04L 5/0096; H04L 5/14; H04L 5/22; H04W 76/023
See application file for complete search history.

(56) References Cited

U.S. PATENT DOCUMENTS

| 2005/0111480 A1 | 5/2005 | Martin |
| 2009/0161636 A1* | 6/2009 | Collins ............. H04W 72/0446 370/336 |
| 2013/0322388 A1* | 12/2013 | Ahn .................... H04W 76/023 370/329 |

FOREIGN PATENT DOCUMENTS

| CN | 1620156 A | 5/2005 |
| CN | 101212272 A | 7/2008 |

(Continued)

*Primary Examiner* — Scott M Sciacca
(74) *Attorney, Agent, or Firm* — Ladas & Parry LLP

(57) ABSTRACT

An offline communication method includes steps of: receiving, by a first TDD (Time Division Duplexing) terminal, an instruction for setting the first TDD terminal as a D2D (Device-to-Device) terminal device; interchanging, by the first TDD terminal, upstream time slots and downstream time slots thereof, and setting the first TDD terminal to be in a mode of conforming a D2D communication environment in response to said instruction; and searching, in a mode that the upstream time slots and the downstream time slots are interchanged, for a second TDD terminal which is adjacent to the first TDD terminal and is not set as a D2D mode, and establishing a connection therebetween after the second TDD terminal is searched out. By this way, communication between those offline intelligent mobile terminals within a short distance can be carried out.

13 Claims, 3 Drawing Sheets

(56) References Cited

FOREIGN PATENT DOCUMENTS

CN 101296520 A 10/2008
CN 104284448 1/2015

* cited by examiner

OFFLINE COMMUNICATION METHOD AND INTELLIGENT MOBILE TERMINAL

FIELD OF THE INVENTION

The present invention relates to a communication technology, and more particularly, to an offline communication method and an intelligent mobile terminal.

DESCRIPTION OF PRIOR ART

As with rapid development of mobile communication terminals, especially with the popularization of mobile communication terminals, communicating between people becomes more and more convenient. However, in the existing skills, all the communication between mobile communication terminals is carried out by a network, such as a cellular network, as a media. For example, when two intelligent mobile terminals adjacent to each other are to carry out voice communication, a caller, one of the intelligent mobile terminals, makes a call, the call is transferred by a base station and then is transmitted to the called party, i.e., the other one of the intelligent mobile terminals, thereby a connection between the caller and the called party is established. The same is true during a voice conversation. It requires transference via the base station as well.

However, when a natural disaster or an accident is occurred such as earthquake, fire, and collapse of a coalmine, and an outer cellular apparatus is damaged or the intelligent mobile terminal cannot connect therewith, the intelligent mobile terminal may be shut off from the world even though the intelligent mobile terminal is fully functional. This may miss the best time for disaster relief or disaster reduction, and may magnify the disaster.

SUMMARY OF THE INVENTION

The technical problem to be solved in the present invention is to provide an offline communication method and an intelligent mobile terminal so as to carry out communication between those offline intelligent mobile terminals within a short distance.

To solve above technical problems, the present invention provides a technical scheme including an offline communication method, which comprises: receiving, by a first TDD (Time Division Duplexing) terminal, an instruction for setting the first TDD terminal as a D2D (Device-to-Device) terminal device communicating with another terminal device; interchanging, by the first TDD terminal, upstream time slots and downstream time slots thereof, and setting the first TDD terminal to be in a mode of conforming to a D2D communication environment in response to said instruction; and searching, by the first TDD terminal in a mode that the upstream time slots and the downstream time slots are interchanged, for an adjacent TDD terminal which is not set as a D2D mode, and establishing a connection between the first TDD terminal and the adjacent TDD terminal after the adjacent TDD terminal is searched out; wherein the first TDD terminal and the adjacent TDD terminal use an identical channel, and operation time slots of the first TDD terminal are synchronous with that of the adjacent TDD terminal after the connection between the first TDD terminal and the adjacent TDD terminal, which is not set as the D2D mode, is established.

According to an embodiment of the present invention, after the step of interchanging, by the first TDD terminal, the upstream time slots and the downstream time slots thereof, and setting the first TDD terminal to be in the mode of conforming to the D2D communication environment in response to said instruction, the method further comprises a step of: broadcasting, by the first TDD terminal, a message such that a second TDD terminal that is adjacent to the first TDD terminal and is not set as the D2D mode is able to take the first TDD terminal as a hotspot and share the resource of the first TDD terminal.

According to an embodiment of the present invention, there is at least one second TDD terminal, and after the step of interchanging, by the first TDD terminal, the upstream time slots and the downstream time slots thereof, and setting the first TDD terminal to be in the mode of conforming to the D2D communication environment in response to said instruction, the method further comprises a step of: receiving a search result concerning the adjacent TDD terminal(s) which is/are not set as the D2D mode and establishing connection(s) to said adjacent TDD terminal(s) that is/are not set as the D2D mode after the connection(s) is/are accepted by the adjacent TDD terminal(s).

To solve above technical problems, the present invention provides another technical scheme including an offline communication method, which comprises: receiving, by a first TDD (Time Division Duplexing) terminal, an instruction for setting the first TDD terminal as a D2D (Device-to-Device) terminal device communicating with another terminal device; interchanging, by the first TDD terminal, upstream time slots and downstream time slots thereof, and setting the first TDD terminal to be in a mode of conforming to a D2D communication environment in response to said instruction; and searching, by the first TDD terminal in a mode that the upstream time slots and the downstream time slots are interchanged, for an adjacent TDD terminal which is not set as a D2D mode, and establishing a connection between the first TDD terminal and the adjacent TDD terminal after the adjacent TDD terminal is searched out.

According to an embodiment of the present invention, the first TDD terminal and the adjacent TDD terminal use an identical channel after the connection between the first TDD terminal and the adjacent TDD terminal, which is not set as the D2D mode, is established.

According to an embodiment of the present invention, operation time slots of the first TDD terminal are synchronous with that of the adjacent TDD terminal after the connection between the first TDD terminal and the adjacent TDD terminal, which is not set as the D2D mode, is established.

According to an embodiment of the present invention, after the step of interchanging, by the first TDD terminal, the upstream time slots and the downstream time slots thereof, and setting the first TDD terminal to be in the mode of conforming to the D2D communication environment in response to said instruction, the method further comprises a step of: broadcasting, by the first TDD terminal, a message such that a second TDD terminal that is adjacent to the first TDD terminal and is not set as the D2D mode is able to take the first TDD terminal as a hotspot and share the resource of the first TDD terminal.

According to an embodiment of the present invention, there is at least one second TDD terminal, and after the step of interchanging, by the first TDD terminal, the upstream time slots and the downstream time slots thereof, and setting the first TDD terminal to be in the mode of conforming to the D2D communication environment in response to said instruction, the method further comprises a step of: receiving a search result concerning the adjacent TDD terminal(s) which is/are not set as the D2D mode and establishing connection(s) to said adjacent TDD terminal(s) that is/are not set as the D2D mode after the connection(s) is/are accepted by the adjacent TDD terminal(s).

To solve above technical problems, the present invention provides a further technical scheme including an intelligent mobile terminal, which is a first TDD terminal (Time Division Duplexing), said intelligent mobile terminal comprising: a receiving module for receiving an instruction for setting the TDD terminal as a D2D (Device-to-Device) terminal device communicating with another terminal device; a control module for interchanging upstream time slots and downstream time slots of the TDD terminal, and setting the TDD terminal to be in a mode of conforming to a D2D communication environment in response to said instruction; a search module for searching, in a mode that the upstream time slots and the downstream time slots are interchanged, for an adjacent TDD terminal which is not set as a D2D mode; and a connection module for establishing a connection to the adjacent TDD terminal.

According to an embodiment of the present invention, the control module is further utilized for selecting a channel identical to that used in the adjacent TDD terminal after communicated with the TDD terminal and connected to the adjacent TDD terminal.

According to an embodiment of the present invention, the control module is further utilized for setting its operation time slots synchronous with that set in the adjacent TDD terminal after communicated with the TDD terminal and connected to the adjacent TDD terminal.

According to an embodiment of the present invention, the intelligent mobile terminal further comprises a transmission module for broadcasting a message such that the adjacent TDD terminal that is not set as the D2D mode is able to take the TDD terminal as a hotspot and share the resource of the TDD terminal.

According to an embodiment of the present invention, there is at least one adjacent TDD terminals.

The technical effects of the present invention are described below. The first TDD terminal of the present invention, distinguished from the conventional skills, interchanges the upstream time slots and the downstream time slots thereof so as to be set as the D2D communication mode upon receiving the instruction for setting the first TDD terminal as a D2D terminal device communicating with another terminal device, and after that, the first TDD terminal searches, in the mode with interchanged time slots, for adjacent TDD terminals which are not set as the D2D mode, and establishes connection(s) therewith. Since the transmitting time slots of the first TDD terminal correspond to the receiving time slots of the adjacent TDD terminal and the receiving time slots of the first TDD terminal correspond to the transmitting time slots of the adjacent TDD terminal, it can be carried out the communication between the first TDD terminal and the adjacent TDD terminal which is not set as the D2D module in a situation that no network is available for the first TDD terminal or the signal of wireless network is weak. This can also effectively enhance the rescue efficiency when natural disasters or other accidents are occurred. Moreover, the communication between the first TDD terminal and the adjacent TDD terminal is offline communication (that is, it is not involved with the internet access requiring charges such as an outer cellular network), and therefore the communication between the first TDD terminal and the adjacent TDD terminal is free of charge and further the user's expense is cut down.

DETAILED DESCRIPTION OF THE PREFERRED EMBODIMENTS

Figure 1:
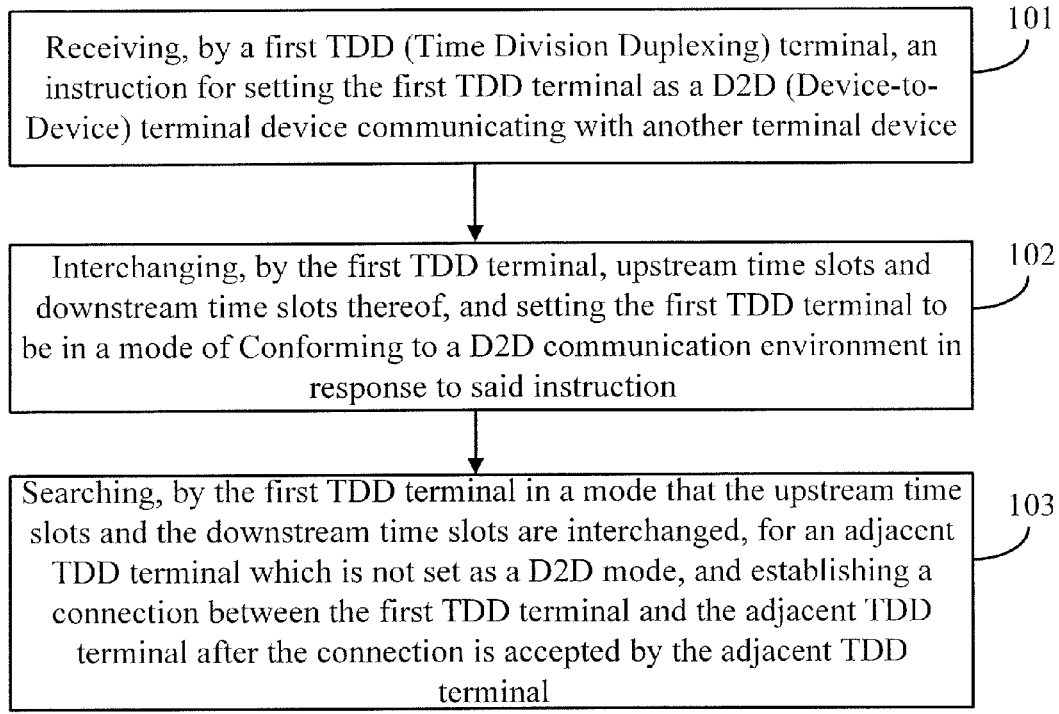
FIG. 1 is a schematic flow of an offline communication method in accordance with an embodiment of the present invention.

Please refer to FIG. 1, which is a schematic flow of an offline communication method in accordance with an embodiment of the present invention. The offline communication method of the present embodiment comprises the following steps.

In Step 101, a first TDD terminal receives an instruction for setting the first TDD terminal as a D2D terminal device communicating with another terminal device.

TDD refers to "Time Division Duplexing", which is a technology that upstream operations are still proceeded during execution of downstream operations in a time-divisional wireless channel per frame period, and is also one of the duplex technologies used in the mobile communication technical field. TPP opposites to FDD (Frequency Division Duplexing).

Figure 2:
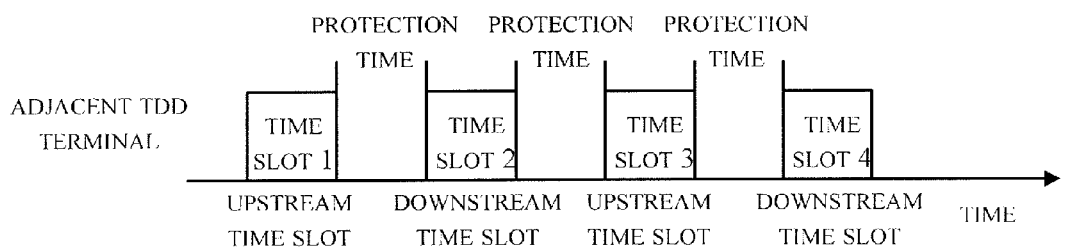
FIG. 2 is a schematic diagram showing principles of the offline communication method in accordance with the present invention.
Figure 2:
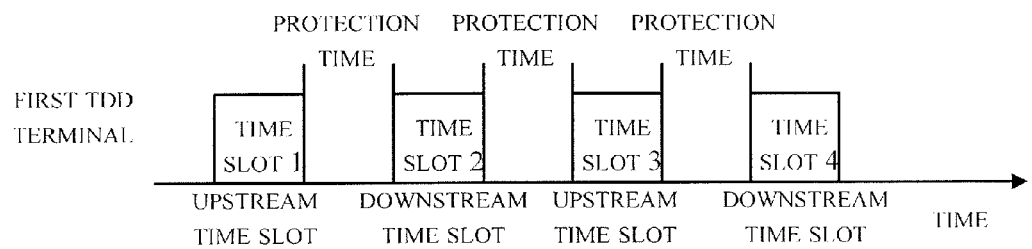

In a mobile communication system, the TDD terminal refers to a terminal that uses protection time to separate a receiving channel and a transmitting channel, and the receiving and the transmitting are executed in different time slots within channels of a same frequency. Using the TDD mode can make full use of radio spectrum. FIG. 2 shows a time slot distribution of an adjacent TDD terminal operated in the TDD-mode communication. As shown in the adjacent TDD terminal in FIG. 2, a short period of time is divided into Time Slot 1, Time Slot 2, Time Slot 3, and Time Slot 4, where Time Slot 1 and Time Slot 3 are used for upstream communication (i.e., Time Slot 1 and Time Slot 3 are upstream slots), and Time Slot 2 and Time Slot 4 are used for downstream communication (i.e., Time Slot 2 and Time Slot 4 are downstream slots). If the upstream time slots are used to receive data, the downstream time slots will be used to transmit data. This depends on the settings of the other party communicated therewith over the base station, and the present invention is not limited thereto. Further, the upstream and downstream communication works on a same frequency and such a way can effectively improve the performance of the terminal device as well as reduce the cost thereof.

The afore-mentioned way the TDD terminal works and its advantages provide the possibility of offline communication.

When a user needs to carry out the offline communication by use of the first TDD terminal, an instruction is transmitted to the first TDD terminal and the instruction is used for setting the first TDD terminal as a D2D terminal device communicating with another terminal device.

Correspondingly, the first TDD terminal receives the aforesaid instruction for setting its communication mode as a D2D communication mode.

In Step 102, in response to the aforesaid instruction, the first TDD terminal interchanges the upstream time slots and the downstream time slots and sets the first TDD terminal to be in a mode of conforming to a D2D communication environment.

When the first TDD terminal serves as a normal mobile communication terminal, the upstream time slots and downstream time slots are the same as the modes of all the other mobile communication terminals (i.e., opposite to the upstream time slots and the downstream time slots of the base station) in order to carry out the communication between the first TDD terminal and the other terminals. That is, the transmitting time slots of the base station correspond to the receiving time slots of the mobile communication terminal and the receiving time slots of the base station correspond to the transmitting time slots of the mobile communication terminal, as shown in the adjacent TDD terminal of FIG. 2.

In order to carry out the device-to-device communication, the first TDD terminal interchanges the upstream time slots and the downstream time slots thereof in response to the aforesaid received instruction. The first TDD terminal somewhat acts as the base station. FIG. 2 shows a time slot distribution of the first TDD terminal operated in the TDD-mode communication after the upstream time slots and the downstream time slots are interchanged. In the first TDD terminal shown in FIG. 2, the first TDD terminal interchanges the upstream time slots and the downstream time slots, where Time Slot 1 and Time Slot 3 are downstream time slots and Time Slot 2 and Time Slot 4 are upstream time slots, contrary to that of the adjacent TDD terminal shown in FIG. 2. The first TDD terminal further configures various parameters so as to conform to the D2D communication environment. For example, these parameters are such as information transmission speed, system operational power, signal transmission approach, and the likes, and the present invention is not limited thereto.

In Step 103, the first TDD terminal searches, in the mode that the upstream time slots and the downstream time slots are interchanged, for adjacent TDD terminals which are not set as the D2D mode, and a connection is established after the adjacent TDD terminal is searched out.

After the first TDD terminal interchanges the upstream time slots and the downstream time slots thereof and is set as the D2D mode, the first TDD terminal launches a search operation and searches around to find out whether there is available adjacent TDD terminal which is not set as the D2D mode, and establishes a connection to the aforesaid adjacent TDD terminal after the adjacent TDD terminal is searched out. The upstream and downstream time slots of both of the two terminals are opposite to each other. For example, Time Slot 1 of the adjacent TDD terminal in FIG. 2 is an upstream time slot while Time Slot 1 of the first TDD terminal in FIG. 2 is a downstream time slot, and Time Slot 2 of the adjacent TDD terminal in FIG. 2 is a downstream time slot while Time Slot 2 of the first TDD terminal in FIG. 2 is an upstream time slot. That is, the transmitting time slots of the first TDD terminal correspond to the receiving time slots of the adjacent TDD terminal and the receiving time slots of the first TDD terminal correspond to the transmitting time slots of the adjacent TDD terminal. Therefore, the first TDD terminal can directly communicate with the adjacent TDD terminal. During the communication, the first TDD terminal and the adjacent TDD terminal use an identical channel, that is, use a carrier wave of an identical frequency for the data transmission. Also, the operation time slots of the first TDD terminal are synchronous with that of the adjacent TDD terminal.

In addition, the communication between the first TDD terminal and the adjacent TDD terminal is not limited to voice communication but it is also applicable to interactive gaming as well as information sending and receiving. The present invention is not limited thereto.

It requires to be noted that the communication between the first TDD terminal and the adjacent TDD terminal is offline communication (that is, it is not involved with the internet access requiring charges such as an outer cellular network), and therefore the communication between the first TDD terminal and the adjacent TDD terminal is free of charge and further the user's expense is cut down.

The first TDD terminal of the present invention, distinguished from the conventional skills, interchanges the upstream time slots and the downstream time slots thereof so as to be set as the D2D communication mode upon receiving the instruction for setting the first TDD terminal as a D2D terminal device communicating with another terminal device, and after that, the first TDD terminal searches, in the mode with interchanged time slots, for adjacent TDD terminals which are not set as the D2D mode, and establishes connection(s) therewith. Since the transmitting time slots of the first TDD terminal correspond to the receiving time slots of the adjacent TDD terminal and the receiving time slots of the first TDD terminal correspond to the transmitting time slots of the adjacent TDD terminal, it can be carried out the communication between the first TDD terminal and the adjacent TDD terminal which is not set as the D2D module in a situation that no network is available for the first TDD terminal or the signal of wireless network is weak. This can also effectively enhance the rescue efficiency when natural disasters or other accidents are occurred. Moreover, the communication between the first TDD terminal and the adjacent TDD terminal is offline communication (that is, it is not involved with the internet access requiring charges such as an outer cellular network), and therefore the communication between the first TDD terminal and the adjacent TDD terminal is free of charge and further the user's expense is cut down.

Figure 3:
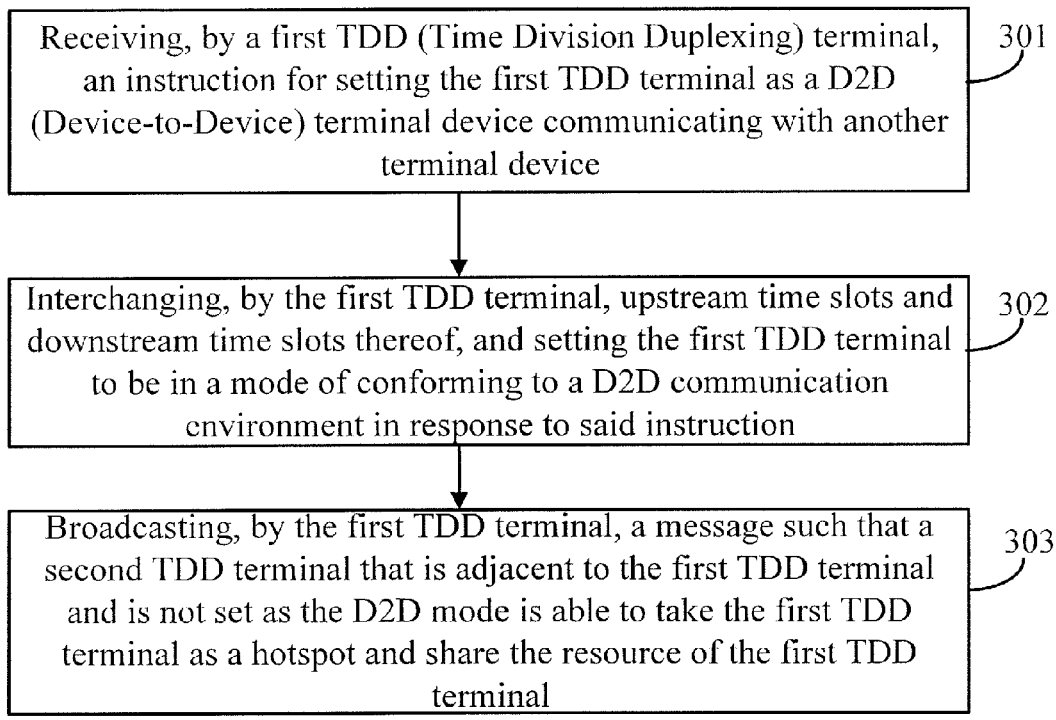
FIG. 3 is a schematic flow of an offline communication method in accordance with another embodiment of the present invention.

FIG. 3 shows another embodiment. As depicted, FIG. 3 is a schematic flow of an offline communication method in accordance with said another embodiment of the present invention.

The method of the present embodiment comprises the following steps.

In Step 301, a first TDD terminal receives an instruction for setting the first TDD terminal as a D2D terminal device communicating with another terminal device.

When a user needs to carry out the offline communication by use of the first TDD terminal, an instruction is transmitted to the first TDD terminal and the instruction is used for setting the first TDD terminal as a D2D terminal device communicating with another terminal device.

The first TDD terminal receives the aforesaid instruction for setting its communication mode as a D2D communication mode.

In Step 302, in response to the aforesaid instruction, the first TDD terminal interchanges the upstream time slots and the downstream time slots and sets the first TDD terminal to be in a mode of conforming to a D2D communication environment.

In order to carry out the device-to-device communication, the first TDD terminal interchanges the upstream time slots and the downstream time slots thereof in response to the aforesaid received instruction. The first TDD terminal somewhat acts as the base station. Meanwhile, the first TDD terminal further configures various parameters thereof and make them conform to a D2D communication environment. For example, these parameters are such as information transmission speed, system operational power, signal transmission approach, and the likes, and the present invention is not limited thereto. After the configuration operation is completed, the first TDD terminal receives a search result concerning the adjacent TDD terminals which are not set as the D2D mode. The first TDD terminal establishes a connection to the aforesaid adjacent TDD terminal that is not set as the D2D mode, after the connection is accepted by the adjacent TDD terminal. By this way, the present embodiment carries out both of an active search and a passive search, and also avoids the situation that the active search is unable to be performed to achieve the D2D connection when the adjacent TDD terminal is not equipped with the configuration function.

In Step 303, the first TDD terminal broadcasts a message over the airwaves such that a second TDD terminal that is adjacent to the first TDD terminal and is not set as the D2D mode can take the first TDD terminal as a hotspot and share the resource of the first TDD terminal.

The first TDD terminal broadcasts the message in a form of hotspot after interchanges the upstream and downstream time slots. The second TDD terminal that is adjacent to the first TDD terminal and is not set as the D2D mode receives the aforesaid message and shares the resource of the first TDD terminal after authenticated by the first TDD terminal. The second TDD terminal can be a single one but it is also possible that a plurality of second TDD terminals shares the resource of the first TDD terminal at the same time. The first TDD terminal of the present embodiment, distinguished from the conventional skills, interchanges the upstream time slots and the downstream time slots thereof, and after that, the first TDD terminal broadcasts the message such that the second TDD terminal that is adjacent to the first TDD terminal and is not set as the D2D mode can take the first TDD terminal as a hotspot and at least one second TDD terminal can share the resource of the first TDD terminal. This can save the memory of the second TDD terminal required to download and store the aforesaid resource. In addition, when an external network is not available or the signal thereof is weak in case of emergency, information can be immediately passed to other second TDD terminals. Such a way increases the number of communication approaches and effectively enhances the rescue efficiency.

Figure 4:
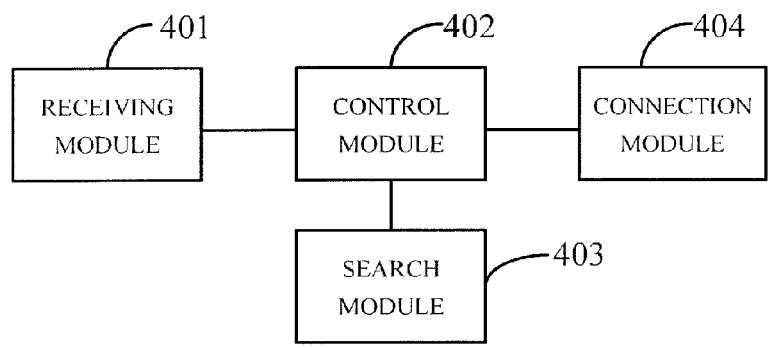
FIG. 4 is a schematic structural diagram showing an intelligent mobile terminal in accordance with an embodiment of the present invention.

Please refer to FIG. 4, which is a schematic structural diagram showing an intelligent mobile terminal in accordance with an embodiment of the present invention. The intelligent mobile terminal of the present embodiment is a TDD terminal, which comprises a receiving module 401, a control module 402, a search module 403, and a connection module 404.

The receiving module 301 is utilized for receiving an instruction for setting the TDD terminal as a D2D terminal device communicating with another terminal device.

TDD refers to "Time Division Duplexing", which is a technology that upstream operations are still proceeded during execution of downstream operations in a time-divisional wireless channel per frame period, and is also one of the duplex technologies used in the mobile communication technical field. TPP opposites to FDD (Frequency Division Duplexing).

In a mobile communication system, the TDD terminal refers to a terminal that uses protection time to separate a receiving channel and a transmitting channel, and the receiving and the transmitting are executed in different time slots within channels of a same frequency. Using the TDD mode can make full use of radio spectrum. As shown in the adjacent TDD terminal in FIG. 2, a short period of time is divided into Time Slot 1, Time Slot 2, Time Slot 3, and Time Slot 4, where Time Slot 1 and Time Slot 3 are used for upstream communication (i.e., Time Slot 1 and Time Slot 3 are upstream slots), and Time Slot 2 and Time Slot 4 are used for downstream communication (i.e., Time Slot 2 and Time Slot 4 are downstream slots). If the upstream time slots are used to receive data, the downstream time slots will be used to transmit data. This depends on the settings of the other party communicated therewith over the base station, and the present invention is not limited thereto. Further, the upstream and downstream communication works on a same frequency and such a way can effectively improve the performance of the terminal device as well as reduce the cost thereof.

The afore-mentioned way the TDD terminal works and its advantages provide the possibility of offline communication.

When a user needs to carry out the offline communication by use of the TDD terminal, an instruction is transmitted to the TDD terminal and the instruction is used for setting the TDD terminal as a D2D terminal device communicating with another terminal device.

Correspondingly, the receiving module 401 receives the aforesaid instruction for setting the TDD terminal as a D2D communication mode.

The control module 402 is utilized for interchanging the upstream time slots and the downstream time slots and setting the first TDD terminal to be in a mode of conforming to a D2D communication environment in response to the aforesaid instruction.

When the TDD terminal serves as a normal mobile communication terminal, the upstream time slots and downstream time slots are the same as the modes of all the other mobile communication terminals (i.e., opposite to the upstream time slots and the downstream time slots of the base station) in order to carry out the communication between the TDD terminal and the other terminals. That is, the transmitting time slots of the base station correspond to the receiving time slots of the mobile communication terminal and the receiving time slots of the base station correspond to the transmitting time slots of the mobile communication terminal, as shown in the adjacent TDD terminal of FIG. 2.

In order to carry out the device-to-device communication, the control module 402 interchanges the upstream time slots and the downstream time slots in response to the aforesaid received instruction. The TDD terminal somewhat acts as the base station. In the first TDD terminal shown in FIG. 2, the first TDD terminal interchanges the upstream time slots and the downstream time slots, where Time Slot 1 and Time Slot 3 are downstream time slots, and Time Slot 2 and Time Slot 4 are upstream time slots, contrary to that of the adjacent TDD terminal shown in FIG. 2. The control module 402 further configures various parameters thereof and make them conform to the D2D communication environment. For example, these parameters are such as information transmission speed, system operational power, signal transmission approach, and the likes, and the present invention is not limited thereto.

The search module 403 is utilized for searching, in the mode that the upstream time slots and the downstream time slots are interchanged, for adjacent TDD terminals which are not set as the D2D mode.

After the control module 402 interchanges the upstream time slots and the downstream time slots thereof and sets the TDD module as the D2D mode, a search operation is launched and the search module 403 searches around to find out whether there is available adjacent TDD terminal which is not set as the D2D mode, and the connection module 404 establishes a connection to the aforesaid adjacent TDD terminal after the adjacent TDD terminal is searched out by the search module 404.

The upstream and downstream time slots of both of the two terminals are opposite to each other. For example, Time Slot 1 of the adjacent TDD terminal in FIG. 2 is an upstream time slot while Time Slot 1 of the first TDD terminal in FIG. 2 is a downstream time slot, and Time Slot 2 of the adjacent TDD terminal in FIG. 2 is a downstream time slot while Time Slot 2 of the first TDD terminal in FIG. 2 is an upstream time slot. That is, the transmitting time slots of the TDD terminal correspond to the receiving time slots of the adjacent TDD terminal and the receiving time slots of the TDD terminal correspond to the transmitting time slots of the adjacent TDD terminal. Therefore, the TDD terminal can directly communicate with the adjacent TDD terminal. During the communication, the TDD terminal and the adjacent TDD terminal use an identical channel, that is, use a carrier wave of an identical frequency for the data transmission. Also, the operation time slots of the first TDD terminal are synchronous with that of the adjacent TDD terminal.

The D2D mode of the communication between the TDD terminal and the adjacent TDD terminal is not limited to voice communication but it is also applicable to interactive gaming as well as information sending and receiving. The present invention is not limited thereto.

It requires to be noted that the communication between the TDD terminal and the adjacent TDD terminal is offline communication (that is, it is not involved with the internet access requiring charges such as an outer cellular network), and therefore the communication between the TDD terminal and the adjacent TDD terminal is free of charge and further the user's expense is cut down.

Distinguished from the conventional skills, the control module of the present embodiment interchanges the upstream time slots and the downstream time slots so as to set the TDD terminal as the D2D communication mode upon the receiving module receives the instruction for setting the TDD terminal as a D2D terminal device communicating with another terminal device, and after that, the search module searches, in the mode with interchanged time slots, for adjacent TDD terminals which are not set as the D2D mode, and the connection module establishes connection(s) therewith. Since the transmitting time slots of the TDD terminal correspond to the receiving time slots of the adjacent TDD terminal and the receiving time slots of the TDD terminal correspond to the transmitting time slots of the adjacent TDD terminal, it can be carried out the communication between the TDD terminal and the adjacent TDD terminal which is not set as the D2D module in a situation that no network is available for the TDD terminal or the signal of wireless network is weak. This can also effectively enhance the rescue efficiency when natural disasters or other accidents are occurred. Moreover, the communication between the TDD terminal and the adjacent TDD terminal is offline communication (that is, it is not involved with the internet access requiring charges such as an outer cellular network), and therefore the communication between the TDD terminal and the adjacent TDD terminal is free of charge and further the user's expense is cut down.

Figure 5:
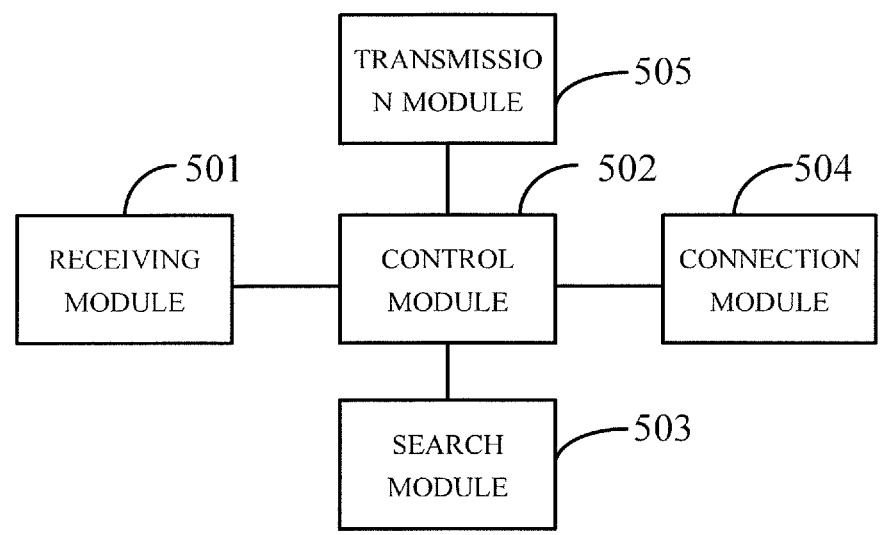
FIG. 5 is a schematic structural diagram showing an intelligent mobile terminal in accordance with another embodiment of the present invention.

Please refer to FIG. 5, which is a schematic structural diagram showing an intelligent mobile terminal in accordance with another embodiment of the present invention. The difference of the intelligent mobile terminal of the present embodiment and that of the previous embodiment is that the intelligent mobile terminal of the present embodiment further comprises a transmission module 505 in addition to the receiving module 501, the control module 502, the search module 503, and the connection module 504.

The transmission module 505 is utilized for broadcasting a message after the control module 505 sets the intelligent mobile terminal in the TDD mode as the D2D terminal. The adjacent TDD terminal that is not set as the D2D mode receives the aforesaid message and shares the resource of the TDD terminal after authenticated by the TDD terminal. The adjacent TDD terminal can be a single one but it is also possible that a plurality of adjacent TDD terminals shares the resource of the TDD terminal at the same time.

Distinguished from the conventional skills, the control module of the present embodiment interchanges the upstream time slots and the downstream time slots, and after that, the TDD terminal broadcasts the message such that the adjacent TDD terminal that is not set as the D2D mode can take it as a hotspot and at least one second TDD terminal can share the resource of the TDD terminal. This can save the memory of the adjacent TDD terminal required to download and store the aforesaid resource. In addition, when an external network is not available or the signal thereof is weak in case of emergency, information can be immediately passed to at least one of other adjacent TDD terminals. Such a way increases the number of communication approaches and effectively enhances the rescue efficiency.

The above descriptions are merely embodiments of the present invention and the scope of the present invention is not limited thereto. Equivalent structure or equivalent process changes made based on the contents of the specification and drawings of the present invention, either directly or indirectly used in other related technologies, should be included in the scope of the present invention.

What is claimed is:

1. An offline communication method, comprising steps of:
   receiving, by a first TDD (Time Division Duplexing) terminal, an instruction for setting the first TDD terminal as a D2D (Device-to-Device) terminal device communicating with another terminal device;
   interchanging, by the first TDD terminal, upstream time slots and downstream time slots of the first TDD terminal, and setting the first TDD terminal to be in a mode of conforming to a D2D communication environment in response to said instruction; and
   searching, by the first TDD terminal in a mode that the upstream time slots and the downstream time slots are interchanged, for a second TDD terminal which is adjacent to the first TDD terminal and is not set as the D2D mode, and establishing a connection between the first TDD terminal and the second TDD terminal after the second TDD terminal is searched out;
   wherein the first TDD terminal and the second TDD terminal use an identical channel, and operation time slots of the first TDD terminal are synchronous with that of the second TDD terminal after the connection between the first TDD terminal and the second TDD terminal, which is not set as the D20 mode, is established.

2. The method according to claim 1, wherein after the step of interchanging, by the first TDD terminal, the upstream time slots and the downstream time slots thereof and setting the first TDD terminal to be in the mode of conforming to the D2D communication environment in response to said instruction, the method further comprises a step of:
broadcasting, by the first TDD terminal, a message such that the second TDD terminal that is adjacent to the first TDD terminal and is not set as the D2D mode is able to take the first TDD terminal as a hotspot and share the resource of the first TDD terminal.

3. The method according to claim 2, wherein there are at least two second TDD terminals adjacent to the first TDD terminal, and after the step of interchanging, by the first TDD terminal, the upstream time slots and the downstream time slots thereof and setting the first TDD terminal to be in the mode of conforming to the D2D communication environment in response to said instruction, the method further comprises a step of:
receiving a search result concerning the second TDD terminals which are adjacent to the first TDD terminal and are not set as the D2D mode, and establishing connections to the second TDD terminals after the connections are accepted by the second TDD terminals.

4. An offline communication method, comprising steps of:
receiving, by a first TDD (Time Division Duplexing) terminal, an instruction for setting the first TDD terminal as a D2D (Device-to-Device) terminal device communicating with another terminal device:
interchanging, by the first TDD terminal, upstream time slots and downstream time slots of the first TDD terminal, and setting the first TDD terminal to be in a mode of conforming to a D2D communication environment in response to said instruction; and
searching, by the first TDD terminal in a mode that the upstream time slots and the downstream time slots are interchanged, for a second TDD terminal which is adjacent to the first TDD terminal and is not set as the D2D mode, and establishing a connection between the first TDD terminal and the second TDD terminal after the second TDD terminal is searched out.

5. The method according to claim 4, wherein the first TDD terminal and the second TDD terminal use an identical channel after the connection between the first TDD terminal and the second TDD terminal, which is not set as the D2D mode, is established.

6. The method according to claim 4, wherein operation time slots of the first TDD terminal are synchronous with that of the second TDD terminal after the connection between the first TDD terminal and the second TDD terminal, which is not set as the D2D mode, is established.

7. The method according to claim 4, wherein after the step of interchanging, by the first TDD terminal, the upstream time slots and the downstream time slots thereof and setting the first TDD terminal to be in the mode of conforming to the D2D communication environment in response to said instruction, the method further comprises a step of:
broadcasting, by the first TDD terminal, a message such that the second TDD terminal that is adjacent to the first TDD terminal and is not set as the D2D mode is able to take the first TDD terminal as a hotspot and share the resource of the first TDD terminal.

8. The method according to claim 7, wherein there are at least two second TDD terminals adjacent to the first TDD terminal, and after the step of interchanging, by the first TDD terminal, the upstream time slots and the downstream time slots thereof and setting the first TDD terminal to be in the mode of conforming to the D2D communication environment in response to said instruction, the method further comprises a step of:
receiving a search result concerning the second TDD terminals which are adjacent to the first TDD terminal and are not set as the D2D mode, and establishing connections to the second TDD terminals after the connections are accepted by the second TDD terminals.

9. An intelligent mobile terminal, which is a first TDD terminal (Time Division Duplexing), said intelligent mobile terminal comprising:
a processor; and
a memory connected with the processor, the memory comprising a plurality of program instructions executable by the processor configured to execute a method, the method comprising:
receiving an instruction for setting the first TDD terminal as a D2D (Device-to-Device) terminal device communicating with another terminal device;
interchanging upstream time slots and downstream time slots of the first TDD terminal, and setting the first TDD terminal to be in a mode of conforming to a D2D communication environment in response to said instruction;
searching, in a mode that the upstream time slots and the downstream time slots are interchanged, for a second TDD terminal which is adjacent to the first TDD terminal and is not set as the D2D mode; and
establishing a connection to the second TDD terminal which is adjacent to the first TDD terminal and is not set as the D2D mode after the second TDD terminal is searched out.

10. The intelligent mobile terminal according to claim 9, wherein the method further comprises:
selecting a channel identical to that used in the second TDD terminal after the first TDD terminal is connected to the second TDD terminal.

11. The intelligent mobile terminal according to claim 9, wherein the method further comprises:
setting its operation time slots synchronous with that set in the second TDD terminal after the first TDD terminal is connected to the second TDD terminal.

12. The intelligent mobile terminal according to claim 9, wherein the method further comprises:
broadcasting a message such that the second TDD terminal that is adjacent to the first TDD terminal and is not set as the D2D mode is able to take the first TDD terminal as a hotspot and share the resource of the first TDD terminal.

13. The intelligent mobile terminal according to claim 12, wherein there are at least two second TDD terminals adjacent to the first TDD terminal and connected therewith.

* * * * *